United States Patent [19]

Witzel et al.

[11] 4,301,178

[45] Nov. 17, 1981

[54] LIQUID-FILLED CHEWING GUM AND METHOD

[75] Inventors: Frank Witzel, Spring Valley; Wayne J. Puglia, Bellerose Village; K. Warren Clark, Brewster; Donald A. M. Mackay, Pleasantville, all of N.Y.

[73] Assignee: Life Savers, Inc., New York, N.Y.

[21] Appl. No.: 145,942

[22] Filed: May 2, 1980

[51] Int. Cl.³ ............................................... A23G 3/30
[52] U.S. Cl. ........................................ 426/5; 426/103; 426/548; 426/429; 426/658
[58] Field of Search ......................... 426/3–6, 426/103, 291, 292, 293, 429

[56] References Cited

U.S. PATENT DOCUMENTS

| | | | |
|---|---|---|---|
| 2,973,273 | 2/1961 | Curtiss | 426/5 |
| 3,020,164 | 2/1962 | Forkner | 426/3 |
| 3,635,735 | 1/1972 | Patil | 426/3 |
| 3,912,817 | 10/1975 | Sapswitz | 426/5 |
| 4,208,431 | 6/1980 | Friello | 426/3 |
| 4,217,368 | 8/1980 | Witzel et al. | 426/3 |
| 4,233,319 | 11/1980 | Fritz | 426/5 |
| 4,250,196 | 2/1981 | Friello | 426/5 |

*Primary Examiner*—Jeanette M. Hunter
*Attorney, Agent, or Firm*—Lawrence S. Levinson; Burton Rodney

[57] ABSTRACT

A liquid-filled chewing gum is provided which releases relatively large amounts of liquid sweetener and/or flavor into the oral cavity. The liquid-filled chewing gum includes a solid phase and a liquid phase, the solid phase includes a gum base matrix including a network of voids or pockets laced throughout the matrix, and the liquid phase includes a liquid sweetener and/or flavor composition, such as a sweetener-flavor solution, retained in the voids or pockets, and surrounded by gum base. Upon chewing, the liquid sweetener and flavor are released into the oral cavity.

A method is also provided for forming the liquid-filled chewing gum.

23 Claims, No Drawings

LIQUID-FILLED CHEWING GUM AND METHOD

BACKGROUND OF THE INVENTION

Conventional chewing gum generally includes gum base to which are added water-soluble sweeteners, for example, various sugars such as sucrose and dextrose, corn syrup, sorbitol and/or artificial sweeteners such as sodium or calcium saccharin, cyclamates, emulsifiers such as lecithin, mono- and diglycerides, and flavors. The chewing gum is generally prepared by melting the gum base, mixing corn syrup or other aqueous softener for 3 to 5 minutes with the gum base followed by the addition of solid sweeteners, for example, sugar, or sorbitol, and flavor and mixing for 5 minutes. The chewing gum is removed from the kettle, rolled and cut to the desired shape.

As the gum is processed as described above, it remains continuous throughout the entire procedure. The result is that the final chewing gum product is a continuous mass of gum base which envelopes the sugar or other sweeteners, as well as the aqueous softener so as to provide a matrix of gum base containing sweetener and aqueous softener.

The gum so-produced initially provides a desirable strong sweet taste which declines rapidly during the first three to five minutes of chewing to a very slight imperceptible level of sweetness. After about five minutes or less, substantially all sweetness is gone.

U.S. Pat. No. 3,894,154 to Graff et al discloses a center-filled chewing gum which includes as a liquid fill an aqueous solution having a dissolved solids portion, and a humectant for retarding increase in viscosity of the center fill. The dissolved solids portion may include invert sugar, sucrose and glucose, while the humectant is glycerine.

British Patent No. 1,469,031 discloses a center-filled chewing gum similar to that disclosed in U.S. Pat. No. 3,894,154 except that in addition to glycerine, the humectant may be polylimonene, sorbitol solution, lecithin, dextrose, gum arabic, glyceryl monostearate, polyethylene glycol or propylene glycol.

Upon chewing the above center-filled chewing gums, a relatively small amount of liquid sweetener is quickly released into the oral cavity and is consumed, almost immediately.

DESCRIPTION OF THE INVENTION

In accordance with the present invention, there is provided a liquid-filled chewing gum which delivers from 2 to 7 or more times as much liquid as center-filled chewing gums heretofore known. The liquid-filled chewing gum of the invention includes a solid phase and a releaseable liquid phase. The solid phase includes a gum base matrix comprised of a plurality of masses of gum base which masses are bound together by water-soluble binder, and having a network of voids or pockets distributed throughout the gum base matrix. The liquid phase includes a liquid composition, preferably including sweetener and/or flavor, retained in the voids or pockets and surrounded by the gum base. Upon chewing, large amounts of the liquid sweetener-flavor composition is released into the oral cavity.

It is essential to the practice of the present invention that a solid to liquid transfer occur, that is, for example, some or substantially all of the solid sugar crystals originally present in the chewing gum are melted or otherwise solubilized and leached from the chewing gum leaving behind a network of voids or pockets. This may be effectively accomplished by placing the chewing gum in a water bath, and preferably subjecting the water bath to a vacuum, to expedite leaching of the sugar crystals from the chewing gum. Within a period, for example, less than 24 hours, the chewing gum releases air bubbles and floats to the surface of the water and is found to be composed of a network of voids or pockets filled with water and is essentially devoid of water-soluble sweeteners.

The chewing gum is then transferred to a solution of sweetener, such as 40 to 70% sugar syrup, and allowed to soak in such solution. With the aid of mild agitation, and preferably under a pressure of from about 14 to about 30 psi, the water which is present in the gum base matrix is replaced by the sugar solution. The chewing gum product provides a unique sensation of sweetness and flavor (originally present in the gum base) release delivered by the large amount of liquid filling the voids or pockets of the gum.

Conventional chewing gums require hydration of the water-soluble sweeteners in the oral cavity to promote sweetness release. However, the chewing gum of the invention delivers the sweetener already in solution, thereby promoting immediate flavor release.

The chewing gum of the invention also delivers substantially more liquid or dissolved sweetener than the so-called center-filled chewing gums. Thus, whereas known center-filled chewing gums (wherein the center fillings are added through mechanical means) exhibit a ratio of 10 to 20% liquid center versus 80 to 90% gum base, the chewing gum of the invention having essentially all of its sweeteners in solution, exhibits up to 70% or more liquid versus as little as 30 % or less gum base.

As indicated hereinbefore, in accordance with the present invention, solid crystals, such as sugar crystals, are leached from the gum base to create voids or pockets which are subsequently filled with liquid sweeteners and flavors.

it should be pointed out that the solid crystals to be removed are preferably initially dispersed throughout the gum base matrix and not merely mixed with the gum base. Thus, the solid crystals must be dispersed in, enveloped by, trapped in and/or otherwise initially protected by the gum base. This is accomplished by mixing the solid crystals with melted gum base while the gum base is a continuous mass, that is before other chewing gum substituents are added to the gum base which might tear apart the gum base, as described in application Ser. No. 953,291, now U.S. Pat. No. 4,217,368 Aug. 12, 1980.

Thus, in one method for preparing gum base for use in accordance with the present invention, the gum base is first melted, emulsifier such as lecithin and the solid crystals, such as sugar crystals are thoroughly mixed, for at least two minutes, in the melted gum base (which is maintained at a temperature preferably not exceeding 200° F.) to effect uniform distribution and seal in the sugar crystals in the gum base.

Merely mixing sugar crystals with gum base and other conventional water-soluble chewing gum ingredients in accordance with conventional chewing gum manufacturing techniques will not produce chewing gum wherein the sugar crystals are sealed in the gum base. When such conventional sugar containing chewing gum is immersed in water, the water-soluble ingredients will dissolve out but the remaining gum base will not contain the desired voids or pockets required in accordance with the teachings of the present invention and thus will not soak up sugar solution or other solution.

The liquid composition which is retained in the voids or pockets of the chewing gum of the invention will generally comprise from about 40 to about 90% and preferably from about 65 to about 80% by weight of the chewing gum.

The liquid composition may comprise a sweetener solution, a flavor solution, or a mixture comprising a sweetener and flavor solution.

The sweetener present in the liquid composition may comprise natural sweeteners or artificial sweeteners. The natural sweeteners where present may comprise from about 20 to about 70%, and preferably from about 50 to about 65% by weight of the liquid composition. Artificial sweeteners where employed may comprise from about 0.001 to about 0.3% and preferably from about 0.1 to about 0.2% by weight of the liquid composition.

Examples of sweeteners which may be employed herein in the liquid composition include, but are not limited to, one or more of the following: natural sweeteners, for example, monosaccharides, such as arabinose, xylose, ribose, glucose, mannose, galactose, fructose, dextrose, or sorbose or mixtures of two or more of the foregoing monosaccharides, disaccharides, such as, sucrose, for example, cane or beet sugar, lactose, maltose or cellobiose; and polysaccharides, glycyrrhizin, molasses, caramel, monoammonium salt of glycyrrhizin, mono-, di- or tri-sodium salt of glycyrrhizin, mono-, di- or tri-potassium salt of glycyrrhizin, and calcium salt of glycyrrhizin; sugar alcohols, such as mannitol, sorbitol, xylitol, maltitol; artificial sweeteners, such as calcium saccharin, sodium saccharin, free acid form of saccharin, ammonium saccharin, aspartame (L-aspartyl-L-phenylalanine methyl ester), naringin dihydrochalcone, neohesperidin dihydrochalcone, cyclamic acid, sodium cyclamate, calcium cyclamate, *Dioscoreophyllum cumminsii* (Serendipity Berry), *Stevia rebaudiana* (Stevioside), *Richardella dulcifica* (Miracle Berry), or thaumatin, with sucrose, mannitol and/or sorbitol being preferred as well as honey syrup, corn syrup, invert sugar syrup, molasses, treacle and liquid sugar.

Hydrogenated starch syrups, also referred to as hydrogenated starch hydrolysates, may be employed in the liquid composition and include those disclosed in U.S. Pat. No. 26,959 or U.S. Pat. No. 3,556,811 as well as various hydrogenated glucose syrups and/or powders which contain sorbitol, hydrogenated disaccharides, hydrogenated tri- to hexa-saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose end groups to sorbitol end groups. In the case of hydrogenated glucose syrups, the total solids are made of from about 4 to about 30% sorbitol, from about 5 to about 65% hydrogenated disaccharides (that is, maltitol), from about 15 to about 75% tri- to hepta-hydrogenated saccharides, and from about 10 to about 65% hydrogenated saccharides higher than hepta.

Examples of particularly suitable hydrogenated starch hydrolysates include from about 6 to about 10% sorbitol, from about 25 to about 55% hydrogenated disaccharides, from about 20 to about 40% hydrogenated tri- to hepta-saccharides, and from about 15 to about 30% hydrogenated saccharides higher than hepta.

Another example of suitble hydrogenated starch hydrolysates include from about 8 to about 20% sorbitol, from about 5 to about 15% hydrogenated disaccharides, and from about 2 to about 75% hydrogenated tri- to penta-saccharides.

The flavor portion of the liquid composition may include flavoring, such as sour or fruit flavoring or non-acid or mint flavoring in an amount ranging from about 0.3 to about 2.0% by weight, and preferably from about 0.5 to about 1.2% by weight of the liquid composition. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint, oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the liquid composition with or without conventional preservatives.

The chewing gum will include a relatively water-insoluble, water-impenetrable gum base in an amount ranging from about 8 to about 50%, and preferably from about 15 to 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I | |
| Ester gum | 88 |
| Rubber latex solids | 10 |
| Lecithin | 2 |
| Base II | |
| Chicle | 30 |
| Jelutong | 60 |
| Gutta soh | 8 |
| Lecithin | 2 |
| Base III | |
| Partially oxidized chicle | 98 |

| | Parts by Weight |
|---|---|
| Lecithin | 2 |
| Base V | |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weigbht of the final gum product. The flavoring may comprise synthetic flavors and oils derived from plants, leaves, flowers, fruit, etc. Representative flavor oils of the type described above with respect to the liquid composition may also be employed in the chewing gum itself.

The chewing gum may contain a sugar sweetener or non-sugar sweetener as described above with respect to the liquid composition. Where present, the natural sugar or sugar alcohol may be employed in an amount ranging from about 90 to about 0.05% by weight of the gum.

The chewing gum may also contain conventional ester gums, polydextrose, fillers, such as calcium carbonate, and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D. & C. coloring agents, and other conventional chewing gum additives as will be apparent to those skilled in the art.

In order to aid in retaining the liquid composition in the chewing gum, especially during packaging or storage, a substantially moisture resistant initial coating is applied over the chewing gum; the moisture resistant coating serves as an encapsulant for the liquid composition and may comprise a dialdehyde coating such as a glutaraldehyde coating or alginate coating such as a calcium alginate coating, or a gelatin-tannic acid reaction product.

A water-insoluble second coating may be applied over the first coating and may take the form of confectioner's glaze or shellac.

The following Examples represent preferred embodiments of the present invention.

EXAMPLE 1

A nougat gum having the following composition is prepared as described below:

| Initial Ingredient | Parts by Weight |
|---|---|
| Gum base | 17 |
| Sugar (Powdered) | 60 |
| Sorbitol syrup | 11 |
| Malto dextrin | 4 |
| Yelkin | 0.2 |
| Granulated sugar | 6 |
| Flavor oil peppermint | 1 |
| Flavor (spray dried) | 0.5 |

One-half of the sugar (powdered) and all of the granulated sugar and yelkin are added to the gum base and mixed for 2 minutes. Flavor oil is added and the mixture mixed for 1 minute. The remaining sugar is added and the mixture is mixed for 2 minutes. Sorbitol syrup and malto dextrin are added and mixing is continued 2 minutes. Thereafter, spray dried flavor is added and the mixture is mixed 1 minute.

The chewing gum is cut or scored (not compressed) into cubes or balls approximately ¾" in diameter. Pieces are then placed in a circulating water bath. When the pieces have risen to the surface (approximately 24 hours, indicating water solubles have been leached therefrom) they are transferred to a circulating 60 Brix sugar solution for an additional 24 hours during which time the gum pieces soak up sugar solution. The pieces are then dipped in a bath of calcium chloride solution followed by a bath in sodium alginate solution. The interim moisture-resistant coating formed of calcium alginate is then allowed to dry. The pieces are then coated with an insoluble moisture impervious coating such as a confectioners glaze or shellac.

The liquid filled product is found to contain about 70% by weight liquid composition which is quickly and easily transferred into the oral cavity upon chewing.

EXAMPLE 2

A peppermint chewing gum is prepared as described in Example 1 and cut into balls ¾" in diameter. Pieces are then placed in a circulating water bath heated at 110° F. and a vacuum applied thereto. After about 3 hours, the pieces have risen to the surface and are then transferred to a circulating 60 Brix sugar solution maintained at 85° F. A pressure of 25 psi is applied to the solution and after about 3 hours, the pieces are removed therefrom.

Thereafter, an initial coating of calcium alginate and a water-impervious coating of shellac are applied as described in Example 1.

The resulting gum is found to contain about 70% liquid fill and has properties similar to the chewing gum of Example 1.

EXAMPLE 3

A sugarless chewing gum is prepared as described in Example 1 (except the gum is transferred to a sorbitol bath (67%)) having the following composition.

| Initial Ingredients | Parts by Weight |
|---|---|
| Gum base | 17 |
| Sorbitol syrup | 25 |
| Yelkin | 0.2 |
| Flavor oil peppermint | 1 |
| Flavor (spray dried) | 0.5 |
| Liquid Fill | |
| Sorbitol solution (67% by weight sorbitol) | |

EXAMPLE 4

A chewing gum is prepared as described in Example 1 except that the interim or initial coating is accomplished through a gelatin-tannic acid interaction.

What is claimed is:

1. A liquid-filled chewing gum having prolonged sweetness including a water-insoluble solid phase and a liquid phase, said solid phase comprising a gum base matrix formed of a plurality of masses of gum base which are bound together by water-soluble binder, said gum base matrix including a network of voids or pockets laced throughout said masses, and said liquid phase comprising a liquid composition which is a member selected from the group consisting of a liquid sweetener solution, a flavor solution and mixtures thereof, retained in said voids or pockets, and surrounded by gum base, whereby upon chewing of said liquid-filled chewing gum, said liquid composition is released into the oral cavity.

2. The chewing gum as defined in claim 1 wherein said liquid composition comprises from about 40 to about 90% by weight of said chewing gum.

3. The chewing gum as defined in claim 1 wherein said liquid composition comprises a liquid sweetener solution.

4. The chewing gum as defined in claim 3 wherein said sweetener solution is a member selected from the group consisting of sorbitol syrup, mannitol, hydrogenated starch hydrolysate, sugar solution, and mixtures thereof.

5. The chewing gum as defined in claim 3 wherein said sweetener solution is a member selected from the group consisting of honey syrup, corn syrup, invert sugar syrup, liquid sugar, molasses and treacle.

6. The chewing gum as defined in claim 3 wherein said sweetener solution also includes a flavorant.

7. The chewing gum as defined in claim 1 further including a substantially moisture-resistant initial coating over said gum base which serves as an encapsulant to retain said liquid fill in said gum base.

8. The chewing gum as defined in claim 7 wherein said initial coating is a member selected from the group consisting of a dialdehyde coating, a gelatin-tannic acid reaction product and an alginate coating.

9. The chewing gum as defined in claim 8 wherein said dialdehyde coating comprises a glutaraldehyde coating.

10. The chewing gum as defined in claim 7 further including a water-insoluble second coating over said initial coating.

11. The chewing gum as defined in claim 10 wherein said second coating comprises confectioner's glaze or shellac.

12. The chewing gum as defined in claim 8 wherein said alginate coating comprises calcium alginate.

13. The chewing gum as defined in claim 12 further including a second water-insoluble coating comprising confectioner's glaze or shellac.

14. The chewing gum as defined in claim 10 further including a candy coating over said water-insoluble second coating.

15. The chewing gum as defined in claim 1 having a short nougat-like discontinuous structure which is easily torn apart.

16. The chewing gum as defined in claim 1 wherein said water-soluble binder is a member selected from the group consisting of sorbitol syrup, malto-dextrin, and mixtures thereof.

17. A method for forming a chewing gum as defined in claim 1 which comprises interdispersing in melted gum base particles of a water-soluble sweetener while said gum base is a continuous mass, soaking the gum base in a water bath thereby causing the water-soluble sweetener to be leached out of the gum base leaving a matrix of pockets therein, disposing the gum base containing said pockets in a bath comprising said liquid composition thereby causing said liquid composition to be sorbed into and retained in said pockets of said gum base to form said chewing gum.

18. The method as defined in claim 17 further including the step of applying an initial coating over said chewing gum to facilitate retention of said liquid composition.

19. The method as defined in claim 18 wherein said initial coating is formed by dipping pieces of said chewing gum in a calcium chloride solution and then dipping said chewing gum in a sodium alginate solution to form a calcium alginate coating.

20. The method as defined in claim 18 wherein said initial coating is formed by a gelatin-tannic acid interaction.

21. The method as defined in claim 18 further including the step of applying a second protective layer over said initial layer.

22. The method as defined in claim 18 including the step of applying a vacuum to the water bath containing the gum base to facilitate leaching of the particles of water-soluble sweetener therefrom.

23. The method as defined in claim 18 including the step of applying pressure to the gum base disposed in said bath of liquid composition to facilitate absorption of said liquid composition into said gum base.

* * * * *